United States Patent
Lee et al.

(10) Patent No.: US 12,288,307 B2
(45) Date of Patent: Apr. 29, 2025

(54) DISPLAY DEVICE AND IMAGE DISPLAY METHOD

(71) Applicant: Realtek Semiconductor Corporation, Hsinchu (TW)

(72) Inventors: Wan Jou Lee, Hsinchu (TW); Sheng Ju Yang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 144 days.

(21) Appl. No.: 18/165,924

(22) Filed: Feb. 7, 2023

(65) Prior Publication Data
US 2024/0070804 A1   Feb. 29, 2024

(30) Foreign Application Priority Data
Aug. 26, 2022  (TW) .................. 111132298

(51) Int. Cl.
*G06T 3/40* (2024.01)
*G06T 7/62* (2017.01)
*G06T 7/68* (2017.01)

(52) U.S. Cl.
CPC .............. *G06T 3/40* (2013.01); *G06T 7/62* (2017.01); *G06T 7/68* (2017.01); *G06T 2200/24* (2013.01)

(58) Field of Classification Search
CPC .... G06T 3/40; G06T 7/62; G06T 7/68; G06T 2200/24
See application file for complete search history.

(56) References Cited

U.S. PATENT DOCUMENTS

| | | | |
|---|---|---|---|
| 2009/0066730 A1* | 3/2009 | Mikawa | G06T 3/40 |
| | | | 348/E5.022 |
| 2015/0253968 A1* | 9/2015 | Joo | G06F 3/04845 |
| | | | 715/798 |
| 2020/0073538 A1* | 3/2020 | Kawashima | G06F 3/04845 |
| 2020/0090302 A1* | 3/2020 | Ichimi | G06F 3/0485 |
| 2020/0265784 A1* | 8/2020 | Bae | G09G 3/3677 |
| 2022/0038629 A1* | 2/2022 | Ozone | G06F 16/51 |

FOREIGN PATENT DOCUMENTS

CN   112308780 A   2/2021

* cited by examiner

*Primary Examiner* — Sing-Wai Wu
*Assistant Examiner* — Khoa Vu
(74) *Attorney, Agent, or Firm* — CKC & Partners Co., LLC

(57) ABSTRACT

An image display method, comprising the following steps: receiving an image signal from a graphics processor by an image processor, wherein the image signal is configured to drive a display panel to display a main image; enlarging a target area in the main image to form a first enlarged image according to an enlargement command; modifying the first enlarged image into a non-rectangular image to use the non-rectangular image as a second enlarged image; and driving the display panel to display the main image and the second enlarged image simultaneously by the image processor, wherein the second enlarged image is overlapped on the main image.

9 Claims, 7 Drawing Sheets

DISPLAY DEVICE AND IMAGE DISPLAY METHOD

CROSS-REFERENCE TO RELATED APPLICATION

This application claims priority to Taiwan Application Serial Number 111132298, filed Aug. 26, 2022, which is herein incorporated by reference in its entirety.

BACKGROUND

Technical Field

The present disclosure relates to technology of displaying images, and more particularly, to a display device and an image display method.

Description of Related Art

With the advancement of microelectronic technology and data transmission technology, the functions of electronic devices are becoming more and more diversified, and the computing performance required by processors has also increased accordingly. However, in many cases, electronic devices may not be equipped with hardware with high computing performance due to design requirements (such as cost, size), resulting in product performance not as expected. Taking a display device as an example, although both image data and display circuits are capable of presenting high-quality images, if the computing performance of the processor is insufficient or the memory space is too small, problems such as distortion and delay may still occur, and the ideal display quality cannot be presented.

SUMMARY

One aspect of the present disclosure is an image display method, comprising: receiving, by an image processor, an image signal from a graphics processor, wherein the image signal is configured to control the image processor to drive a display panel to display a main image; enlarging a target area in the main image to form a first enlarged image according to an enlargement command; modifying the first enlarged image into a non-rectangular image to use the non-rectangular image as a second enlarged image; and driving, by the image processor, the display panel to display the main image and the second enlarged image simultaneously, wherein the second enlarged image is overlapped on the main image.

Another aspect of the present disclosure is an image display device, comprising a display panel and an image processor. The image processor is coupled to the display panel, and is configured to receive an image signal from a graphics processor to drive the display panel to display a main image. The image processor is configured to enlarge a target area in the main image to form a first enlarged image according to an enlargement command. The image processor is further configured to modify the first enlarged image into a non-rectangular image to use the non-rectangular image as a second enlarged image. The display panel is configured to display the main image and the second enlarged image simultaneously, wherein the second enlarged image is overlapped on the main image.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
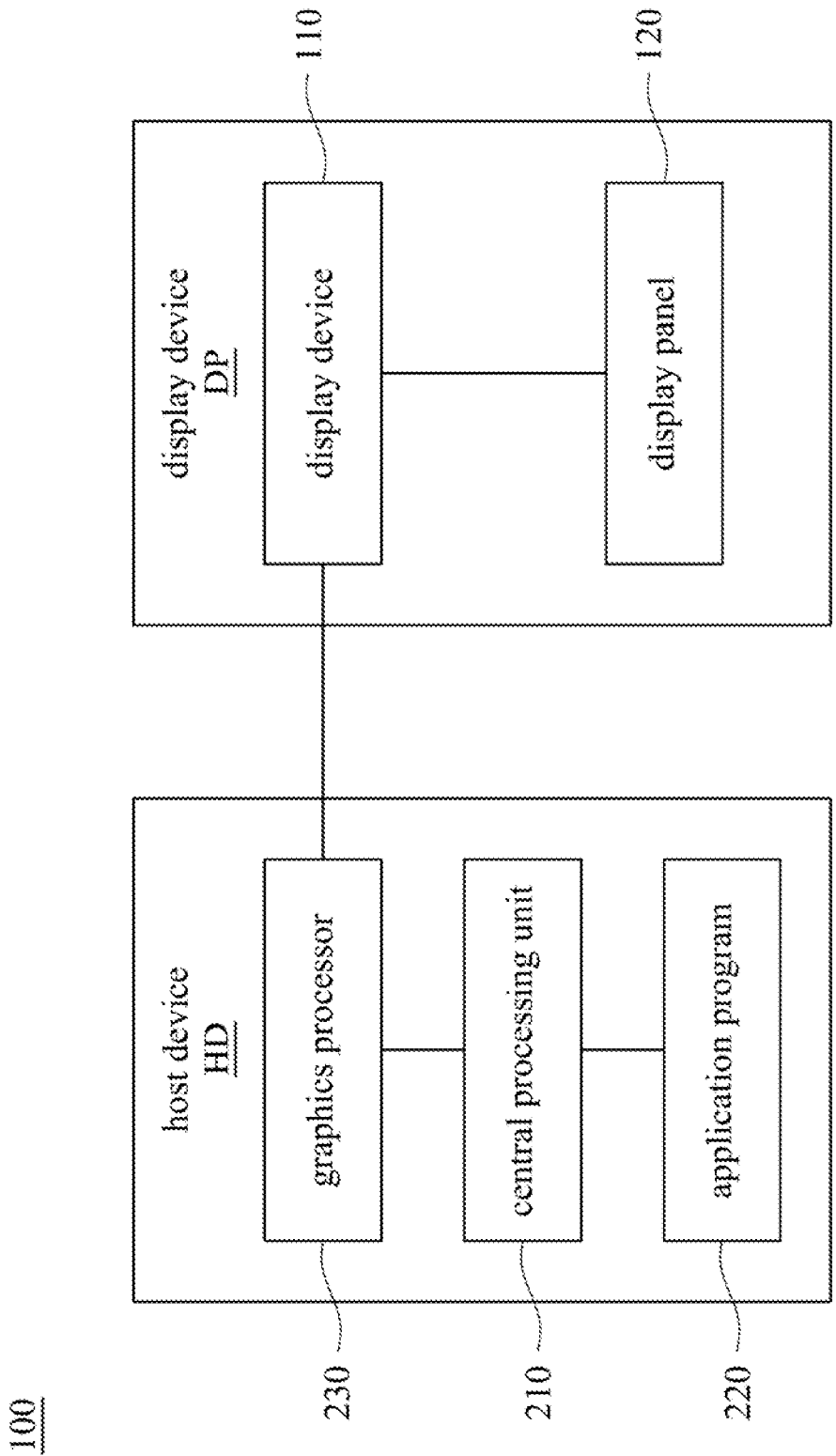
FIG. 1 is a schematic diagram of a display system in some embodiments of the present disclosure.

FIG. 1 is a schematic diagram of a display system 100 in some embodiments of the present disclosure. The display system 100 includes a host device HD and a display device DP. In one embodiment, the display device DP is coupled to the host device HD, so as to receive a image signal from a graphics processor 230 (Graphics Processing Unit, GPU) in the host device HD. The display device DP includes an image processor 110 (e.g., Scaler) and a display panel 120. The image processor 110 is configured to analyze the image signal, and drive the display panel 120 to display a main image corresponding to display signal according to the image signal.

In some embodiments, the host device HD may be implemented to a computer host. The display device DP may be implemented to a monitor of the computer, and is coupled to the host device HD by wired or wireless means, but the present disclosure is not limited to this.

In some embodiments, the host device HD further includes a central processing unit (CPU) 210, and installs an application program 220 (e.g., stored in memory). The application program 220 may be implemented to a video display program, or a game program. When the central processing unit 210 executes the application program 220, the central processing unit 210 generates an corresponding image signal by the graphics processor 230, and transmits the image signal to the display device DP to display the image corresponding to the application program 220, such as a video screen or a game screen. The full screen image on the display panel 120 of the display device DP is hereinafter referred to as "main image".

Figure 2A:
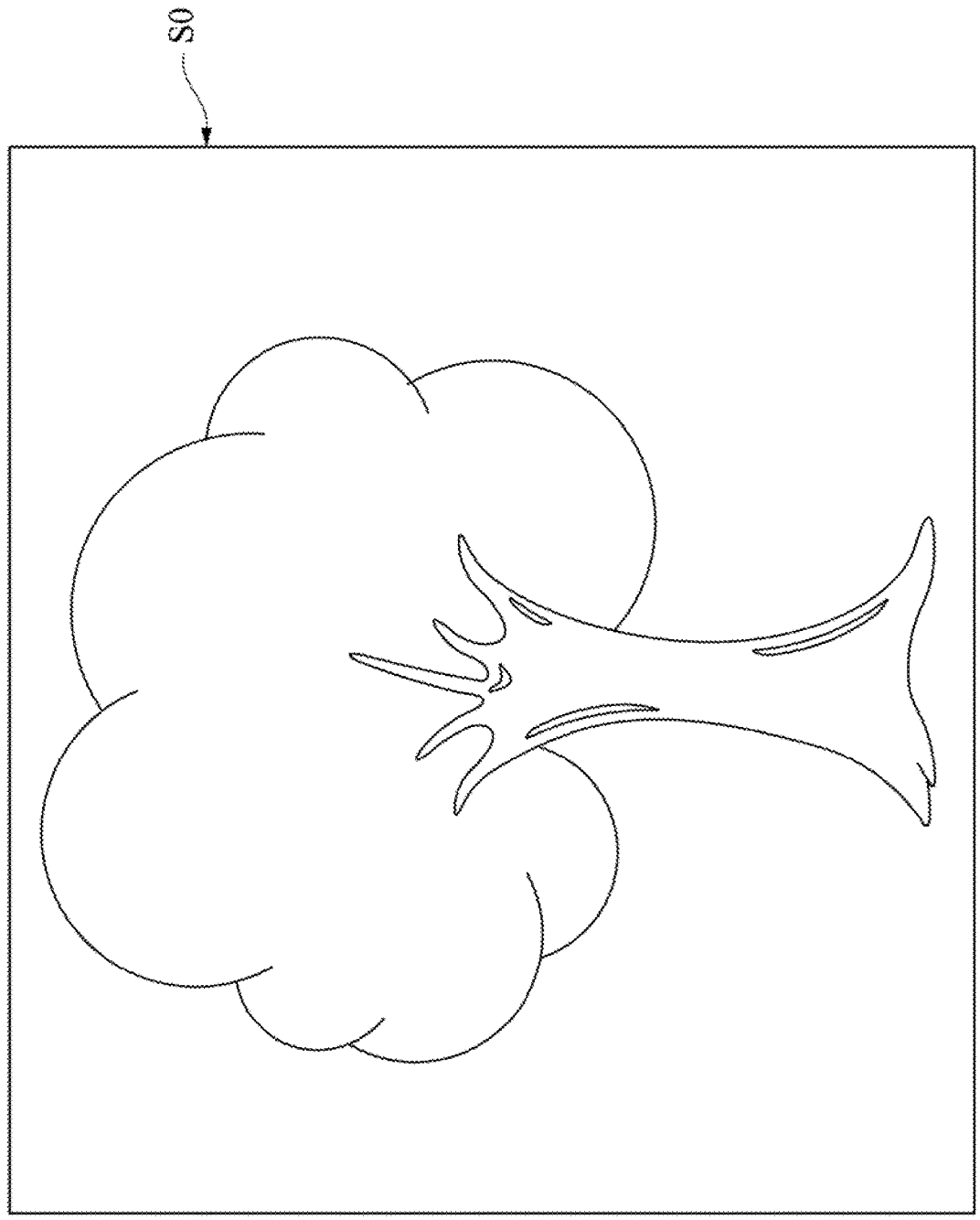
FIG. 2A is a schematic diagram of a main image generated by the display device in some embodiments of the present disclosure.
Figure 2B:
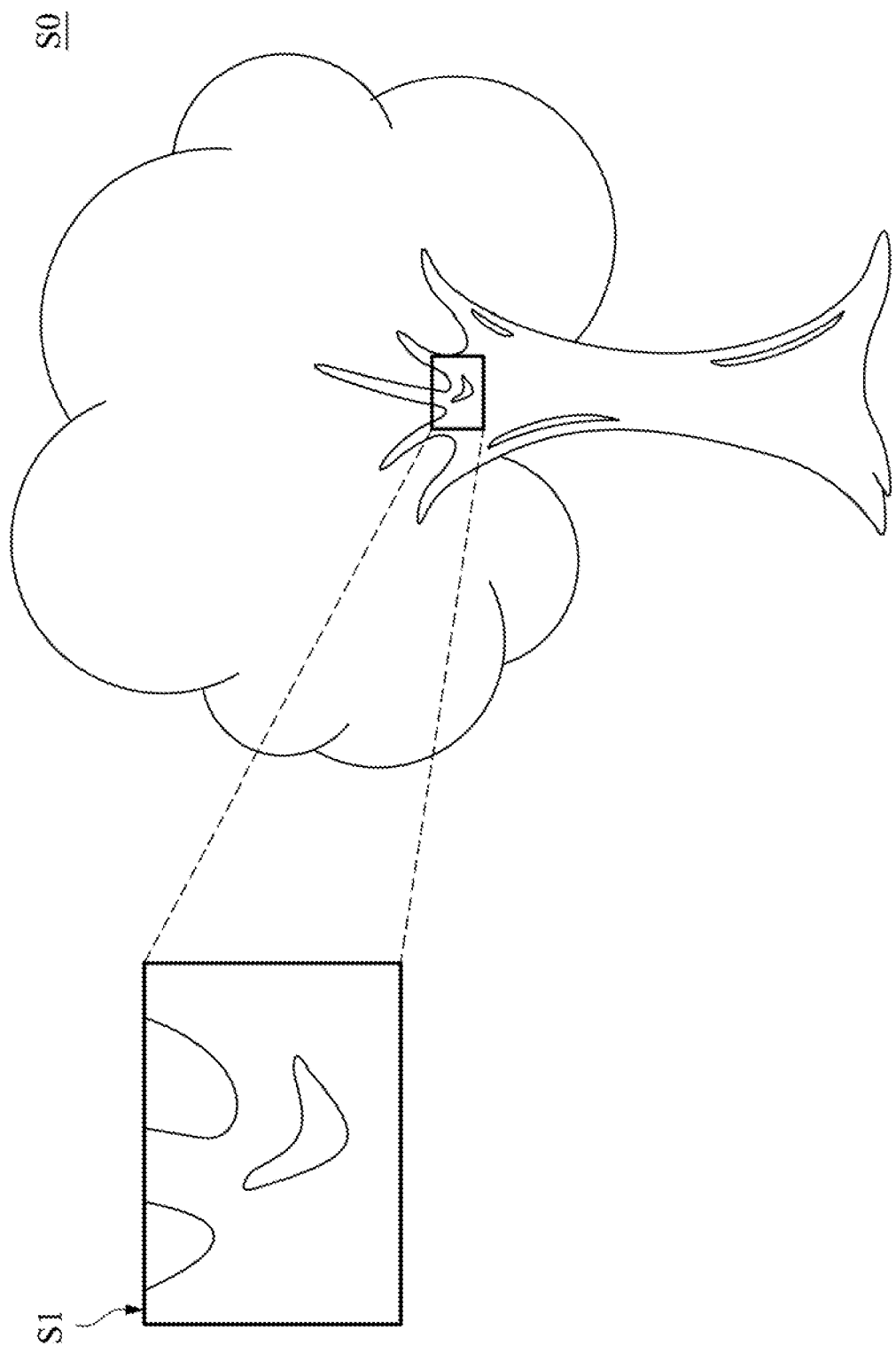
FIG. 2B is a schematic diagram of the main image and a partial area of an enlarged image in some embodiments of the present disclosure.

FIG. 2A is a schematic diagram of a main image S0 generated by the display device DP in some embodiments of the present disclosure. During the process of the application program 220 being executed, the host device HD receives a enlargement command input by user (e.g., enable "magnifying glass", "sniper scope" function), and enlarges a target area in the main image S0 according to the enlargement command. FIG. 2B is a schematic diagram of the main image S0 and a partial area of an enlarged image (hereinafter referred to as a first enlarged image S1) in some embodiments of the present disclosure. In one method, the display system 100 executes the enlargement command by the graphics processor 230 to enlarge a partial area of the main image S0 to the first enlarged image S1.

However, this method is not ideal, because the operation of "enlarging a partial area of the main image S0" by the graphics processor 230 will increase the computation of the graphics processor 230, which will delay the speed of generating or transmitting the image signal.

In one embodiment of the present disclosure, the display system 100 performs "enlarging a partial area of the main image S0" by the image processor 110 of the display device DP to reduce the computation of the graphics processor 230. In other words, the image processor 110 is configured to receive the enlargement command from the graphics processor 230, and identify a target area (e.g., a partial area in the center of the main image S0) of the main image S0 according to the enlargement command.

The image processor 110 enlarges the target area to form the first enlarged image S1. Next, the image processor 110 is further configured to modify(cut) a non-rectangular image (e.g., circular area) from the first enlarged image S1 to form a second enlarged image.

In particular, in some embodiments, the image processor 110 is configured to modify the first enlarged image S1 into a circular area, but the present disclosure is not limited to this, the image processor 110 can also modify the first enlarged image S1 into an ellipse, or into other non-rectangular areas (e.g., polygons) that are symmetrical about a center point.

Figure 2C:
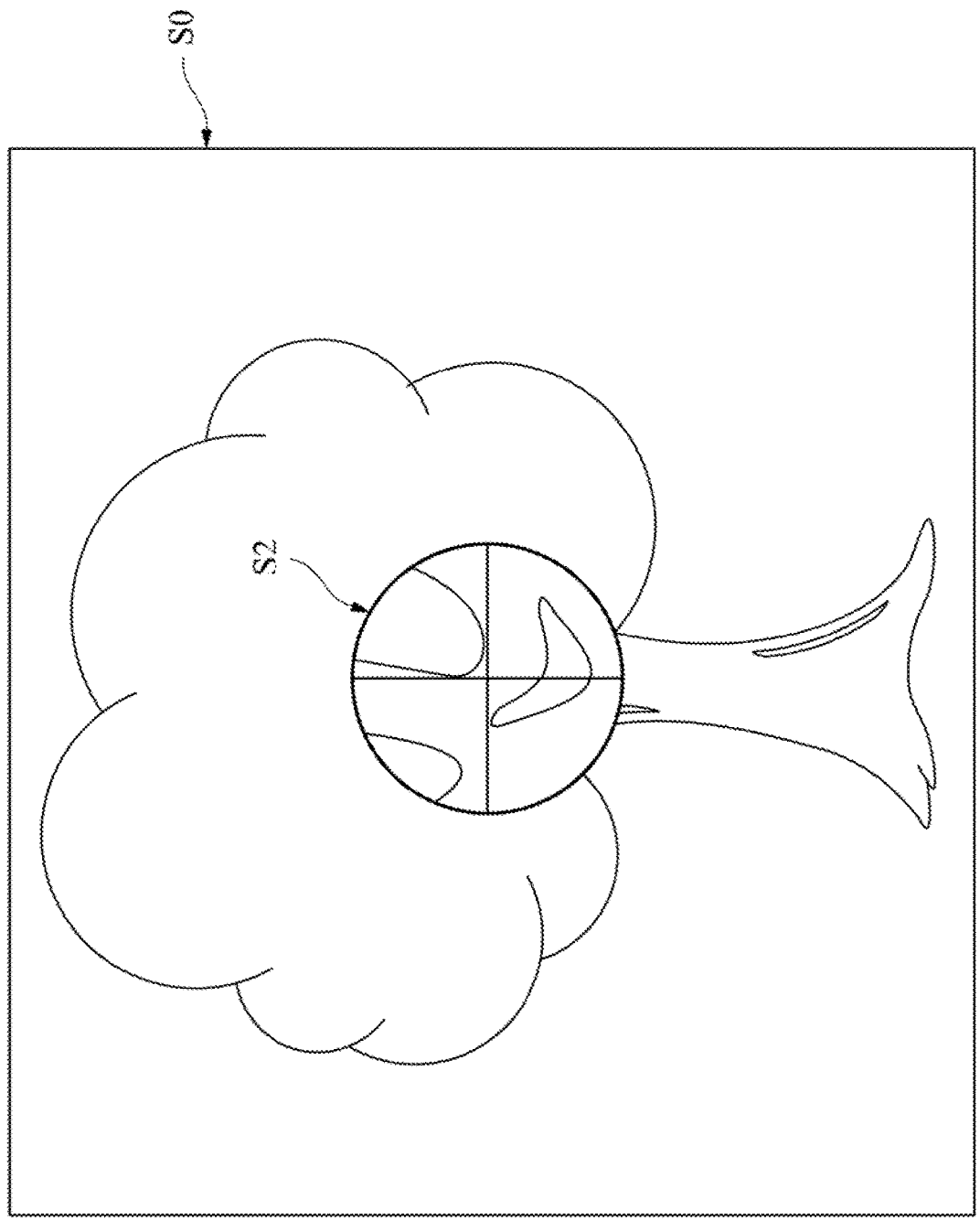
FIG. 2C is a schematic diagram of a second enlarged image in some embodiments of the present disclosure.

FIG. 2C is a schematic diagram of a second enlarged image S2 in some embodiments of the present disclosure. After generating the second enlarged image S2, the image processor 110 drives the display panel 120, so that the display panel 120 simultaneously displays the main image S0 and the second enlarged image S2. As shown in figure, in some embodiments, the second enlarged image S2 is located above the main image S0, and covers the area that overlaps with the main image S0. In other words, the second enlarged image S2 is overlapped on the main image S0.

In some other embodiments, in order for the user to clearly identify the second enlarged image S2, the image processor 110 can reduce brightness of "other areas not covered/overlapped by the second enlarged image S2" in the main image S0 (e.g., into a black image), or the image processor 110 may blur the area.

Figure 3:
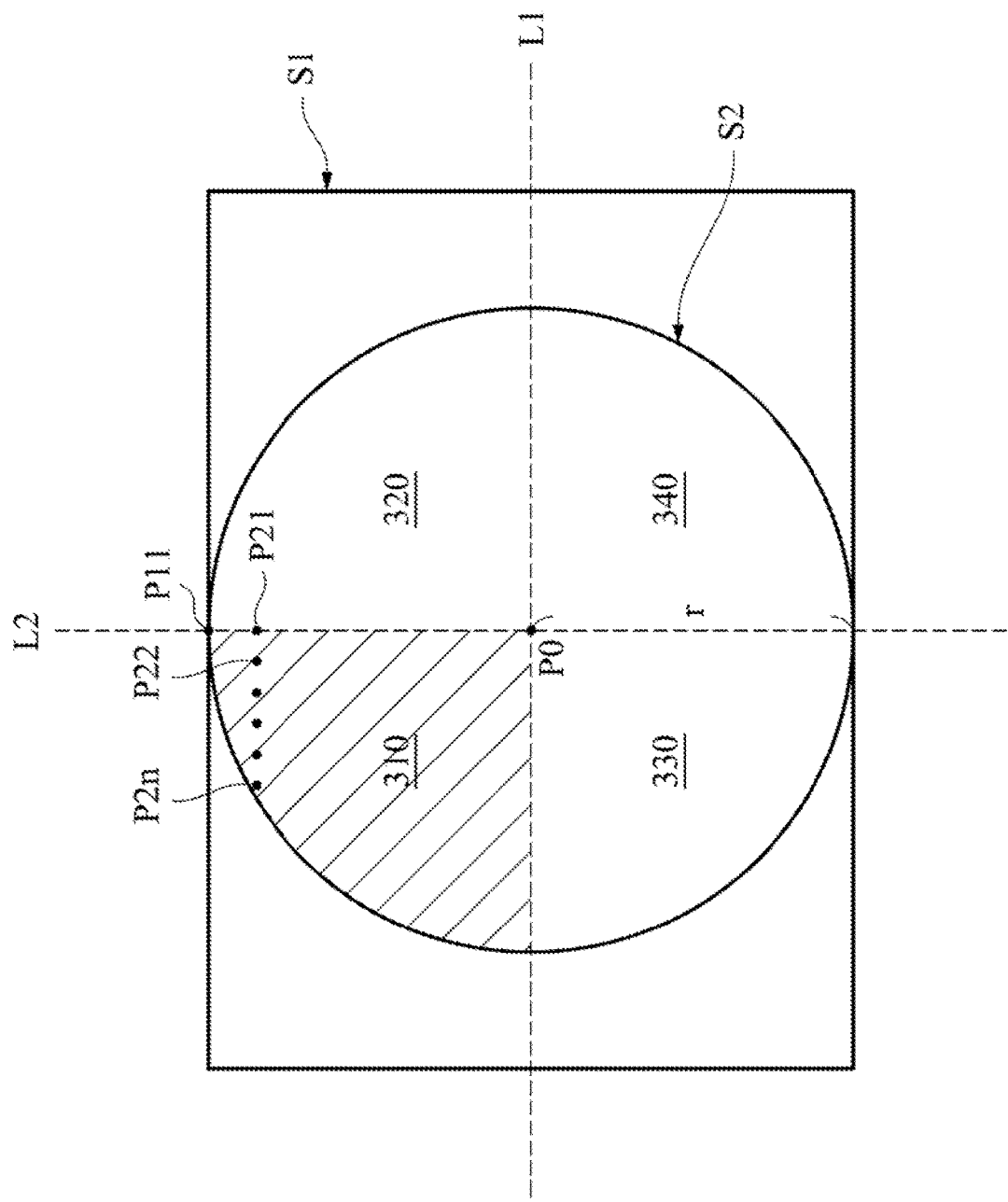
FIG. 3 is a schematic diagram of the modification method of the first enlarged image in some embodiments of the present disclosure.

FIG. 3 is a schematic diagram of the modification method of the first enlarged image S1 in some embodiments of the present disclosure. The image processor 110 modifies a circular image from the first enlarged image S1, and the image processor 110 uses the circular image as the second enlarged image S2. In one embodiment, a circle center P0 of the circular image is located at the center of the first enlarged image S1, and the diameter of the circular image is less than or equal to a short side of the first enlarged image S1 (e.g., a side of the first enlarged image S1 parallel to a vertical line L2 in FIG. 3). Since the outline of the final output second enlarged image S2 is a circle, area of the second enlarged image S2 will be symmetrical along a horizontal line L1 and a vertical line L2, in order to reduce the computation of the image processor 110, the image processor 110 can only determine/calculate one sector area, and then use a symmetry relationship of the image to determine/calculate other pixels of the first enlarged image S1 corresponding to the second enlarged image S2.

AS shown in FIG. 3, specifically, the image processor 110 is configured to set a circle center P0 and a radius r of a circular area in the first enlarged image S1. The circle center P0 and the radius r are configured to determine a sector area (e.g. the sector area 310 in the upper left corner, which is divided by the horizontal line L1 or the vertical line L2 in FIG. 3). The image processor 110 obtains multiple first pixels located in the sector area 310 in the first enlarged image S1 (e.g., confirm the coordinates of each pixel in the sector area 310). Since each of the sector areas 310 to 340 is symmetric with the circle center as the center, the image processor 110 takes "circle center P0" as the symmetry point, and further obtains multiple second pixels symmetric with the first pixels. That is, obtaining the pixel coordinates of the other sector areas 320-340 in the first enlarged image S1.

For example, after the image processor 110 determines the pixel coordinates in the sector area 310, the image processor 110 maps the pixel coordinates with the vertical line L2 as the center to obtain pixel coordinates in the sector area 320 coordinates. Next, the image processor 110 maps the pixel coordinates in the sector areas 310 and 320 with the horizontal line L1 as the center to obtain pixel coordinates in the sector areas 330 and 340.

The method for determining "first pixels of the sector area 310 in the first enlarged image S1" is explained as follows. First, the image processor 110 sets one first pixel in the sector area 310 as a first starting point P11. The distance between the first starting point P11 and the circle center P0 is equal to the radius r. Next, the image processor 110 is configured to obtain another first pixel at every fixed first interval (e.g., one pixel width) along a first direction (e.g., direction of the horizontal line L1), and set each of those first pixels as a first detection point. That is, multiple first detection points will be separated from each other by the first interval. The image processor 110 sequentially determines whether the distance between each first detection point and the circle center P0 is equal to or less than the radius r. If the distance between each first detection point and the circle center P0 is equal to or less than the radius r, it means that this first detection point is located in the sector area 310 and belongs to a pixel in the second enlarged image S2. If the distance between each first detection point and the circle center P0 is not equal to and not less than the radius r, it means that this first detection point is located outside the sector area 310 and does not belong to a pixel of the second enlarged image S2.

For example, if a first starting point P11 just belongs to the edge of the second enlarged image S2, then after the image processor 110 confirms that the distance between the first starting point P11 and the circle center P0 is equal to the radius r, the distance between the first detection point, which is set next by the image processor 110 (i.e., a first pixel to the left of the first starting point P11) and the circle center P0 must be greater than the radius r, that is, outside the second enlarged image S2.

When the distance between the first detection point currently determined by the image processor 110 and the circle center P0 is greater than the radius r, it means that all pixels with the same horizontal axis as the first starting point P11 and belonging to the second enlarged image S2 have been found. At this time, the image processor 110 will set a new starting point along the vertical axis coordinates to determine whether pixels in other horizontal rows adjacent to the first starting point P11 belong to the second enlarged image S2.

Specifically, the image processor 110 sets another first pixel in the first enlarged image S1 adjacent to the first starting point P11 as a second starting point P21. The distance between the second starting point P21 and the circle center P0 is less than the radius r, and is different from the first starting point P11 (in one embodiment, the second starting point P21 is separated from the first starting point P11 by an interval distance (e.g., one pixel height) along a second direction). The image processor 110 obtains another first pixels at every fixed second interval (e.g., one pixel width) along the first direction, and sets those first pixels as second detection points P22-P2n. The image processor 110 sequentially determines whether the distance between each second detection point P22-P2n and the circle center P0 is equal to or less than the radius r.

Accordingly, the foregoing steps are repeated until a starting point set by the image processor 110 is equal to the circle center P0. When all the pixels that have the same Y-axis coordinate as the circle center P0 (see FIG. 5) and belong to the second enlarged image S2 are determined, it means that the image processor 110 has determined all pixels in the sector area 310.

Therefore, after confirming all pixels in the sector area 310, the image processor 110 only needs to use the symmetry relationship to obtain the coordinates of all pixels in other sector areas 320-340, and further knows how to modify the first enlarged image S1 into the second enlarged image S2.

Figure 4:
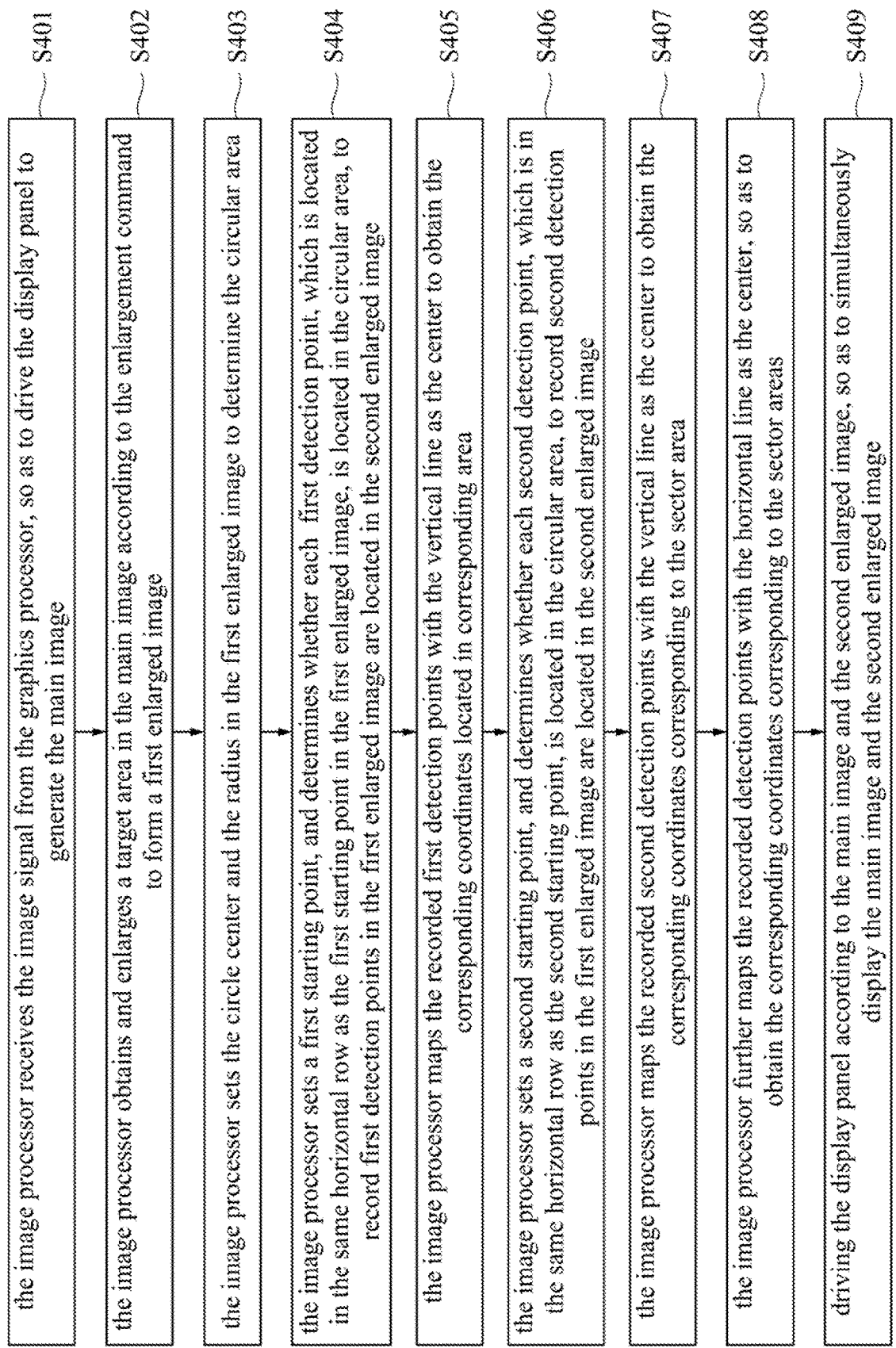
FIG. 4 is a flowchart illustrating of an image display method in some embodiments of the present disclosure.

FIG. 4 is a flowchart illustrating of an image display method in some embodiments of the present disclosure. In step S401, the image processor 110 receives the image signal from the graphics processor 230, so as to drive the display panel 120 to generate the main image S0. In step S402, the image processor 110 receives the enlargement command from the graphics processor 230, and obtains and enlarges a target area in the main image S0 according to the enlargement command to form a first enlarged image S1. In some embodiments, the target area is a partial rectangular area in the center of the main image S0. That is, the image processor 110 sets a center point of the first enlarged image S1 as a circle center P0 of the second enlarged image S2, but the present disclosure is not limited to this. The image processor 110 can also set a specific coordinate from the enlargement command as the circle center P0 of the second enlarged image S2, so as to capture a circular area in the main image S0 with the specific coordinate as a center point.

In step S403, in order to modify the first enlarged image S1 into a circular area to form the second enlarged image S2, the image processor 110 sets the circle center P0 and the radius r in the first enlarged image S1 to determine the circular area (i.e., the second enlarged image S2) according to the enlargement command.

In step S404, the image processor 110 sets a first starting point P11 in the first enlarged image S1. The distance between the first starting point P11 and the circle center P0 will be equal to the radius r. Next, the image processor 110 sequentially obtains multiple first detection points located in the same horizontal row as the first starting point P11 in the first enlarged image S1. In other words, the first starting point P11 and all the first detection points have the same Y-axis coordinate. The image processor 110 sequentially determines whether each the first detection point is located in the circular area (i.e., the second enlarged image S2), to record first detection points in the first enlarged image S1 are located in the second enlarged image S2.

Figure 5:
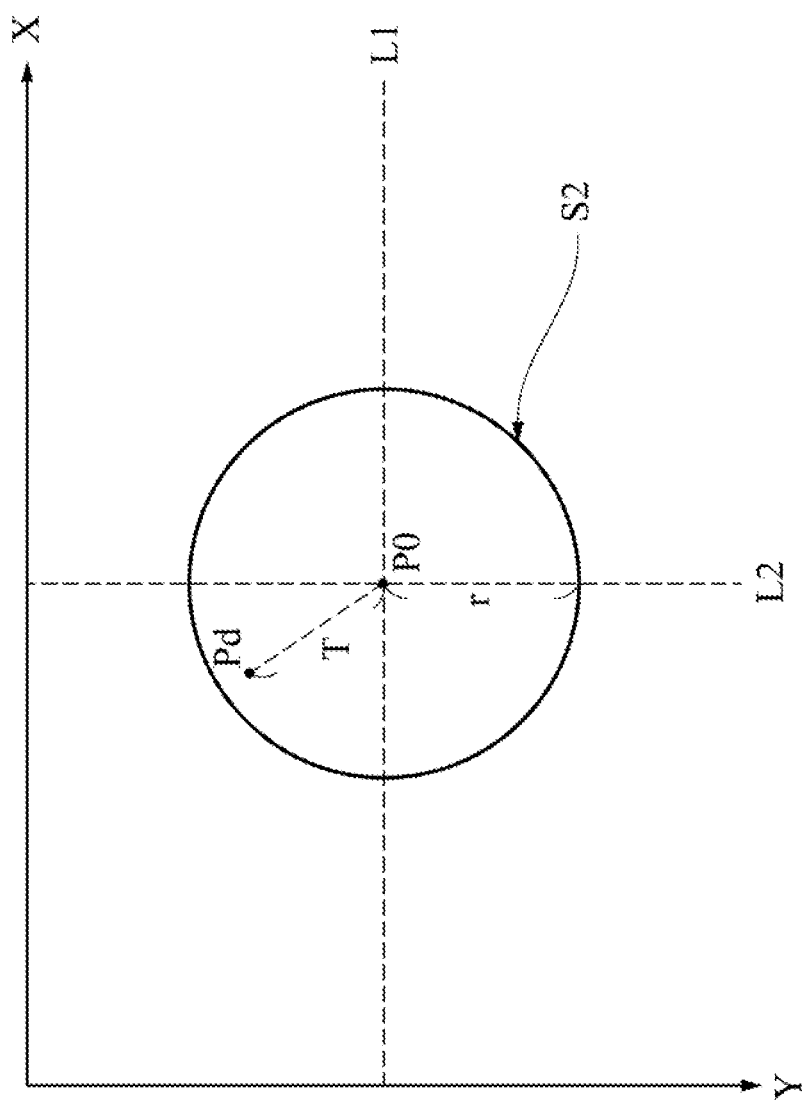
FIG. 5 is a schematic diagram of an image display method in some embodiments of the present disclosure.

FIG. 5 is a schematic diagram of an image display method in some embodiments of the present disclosure. In one embodiment, the origin point of the coordinates set by the image processor 110 is located at the upper left in the FIG. 5, and X-axis and Y-axis extend to the right and to the bottom in the FIG. 5, respectively. If the coordinates of a detection point Pd are (x, y), and the coordinates of the circle center P0 are $(x_c, y_c)$, then distance T between the detection point Pd and the circle center P0 can be expressed as the following formula one:

$$T^2(x-x_c)^2+(y-y_c)^2 \quad \text{(formula one)}$$

If the distance T is greater than the radius r, it means that the detection point Pd is located outside the area of the second enlarged image S2. For the convenience of judgment, the difference between "the square value of the distance T and the square value of the radius r" can be defined as "determine value d". If the determined value d is less than or equal to zero, it means that the detection point Pd is located in the area of the second enlarged image S2. The determined value d can be expressed as the following formula two:

$$d=(x-x_c)^2+(y-y_c)^2-r^2 \quad \text{(formula two)}$$

Since the above formula needs to calculate the square value, the circuit design needs to use multipliers and comparators, which will increase the computation. In one embodiment of the present disclosure, the above calculation method can be simplified. As shown in FIG. 3, the image processor 110 first sets a first starting point P11 in the first enlarged image S1. The coordinates of the first starting point P11 are $(x_1, y_1)$, the formula of the determine value d1 can be expressed as the following formula three:

$$d1=(x_1-x_c)^2+(y_1-y_c)^2-r^2=0 \quad \text{(formula three)}$$

In one embodiment, the image processor 110 sets a pixel as the first starting point P11, the distance between this pixel and the circle center P0 is exactly the radius r (i.e., the determine value d1 will be zero). Next, the image processor 110 is configured to set first detection points at every fixed first interval (e.g., a pixel width, that is, a coordinate scale on the Y-axis) along the first direction (e.g., the horizontal line L1 or the direction of the X-axis), for example, the coordinates of one of first detection points are $(x_2, y_2)$. The determined value d2 of the first detection point P12 can be expressed as the following formula four:

$$d2=(x_2-x_c)^2+(y_2-y_c)^2-r^2 \quad \text{(formula four)}$$

According to the relationship of "$x_2=x_1-1$" and "$y_2=y_1$", the difference d2 can be expressed as the following formula five:

$$d2=((x_1-1)-x_c)^2+((y_1-y_c)^2-r^2=d+2(x_c-x_1)-1 \quad \text{(formula five)}$$

In other words, the image processor 110 first sets a pixel as a starting point, and the distance between this pixel and the circle center P0 is the radius r. The image processor 110 moves one by one along the first direction by a "specific interval (e.g., 1 pixel)" to set the next starting point, so as to simplify the computation of "the determine value". As in above formula, when the specific interval is "1 pixel", the determined value between "the distance between each detection point and the circle center P0" and the radius r can be expressed as the following formula six:

$$d_{new}=d_{pre}+2(x_c-x_{pre})-1 \quad \text{(formula six)}$$

In the above formula, $d_{new}$ is the determine value of the current detection point (e.g., the first detection point P12); $d_{pre}$ is the determine value of the first starting point P11 or the previous the detection point; $x_{pre}$ is the X coordinate of the first starting point P11 or the previous detection point. The simplified formula only has addition and subtraction, and does not need to calculate the square value, so the computation of the image processor 110 can be reduced. If the value of the determined value $d_{new}$ is equal to or less than zero, it means that the detection point is still located within the circular area of the second enlarged image S2.

In step S405, referring to FIG. 3-FIG. 5, after confirming the coordinates of first detection points in the first enlarged image S1, which are located in the second enlarged image S2, the image processor 110 maps the recorded first detection points with the vertical line L2 as the center to obtain the corresponding coordinates located in the sector area 320.

In step S406, when the distance between the first detection point currently determined by the image processor 110 and the circle center P0 is greater than the radius r, it means that the pixels in this direction have been detected. At this time, the image processor 110 sets a second starting point P21 at the first enlarged image S1. In some embodiments, the X-axis coordinates of the first starting point P11 and the second starting point P21 are the same, and the distance between the second starting point P21 and the circle center P0 will be less than the radius r.

Specifically, since there is a relationship between the first starting point P11 and the second starting point P21 that "the X coordinates of the two are the same, but the Y coordinates of the two are different", according to the above formula two and the formula three, the determine value of the second starting point P21 can be expressed as the following formula seven:

$$d_{new}=((x_{new}-x_c)^2+((y_{ori}+1)-y_c)^2-r^2=d_{pre}-2(y_c-y_{ori})+1 \quad \text{(formula seven)}$$

In the above formula, $d_{new}$ is the determine value of the second starting point P21; $d_{pre}$ is the determine value of the first starting point P11; $x_{new}$ is the X coordinate of the second starting point P21; $y_{ori}$ is the Y coordinate of the first starting point P11. It can be seen from the formula seven that the determine value of the second starting point P21 can be calculated from the determine value of the first starting point P11, and there is no need to calculate the square value, so the computation of the image processor 110 can be reduced.

As mentioned above, after confirming that the distance between the second starting point P21 and the circle center P0 is less than the radius r, the image processor 110 sequentially obtains multiple second detection points P22-P2n, and the second detection points P22-P2n are in the same horizontal row as the second starting point P21 in the first enlarged image S1. In other words, the second starting point P21 and all the second detection points P22-P2n have the same as the Y-axis coordinate. The determined value of each second detection point P22-P2n can be obtained by calculating the recurrence relation according to the determined value of the second starting point P21, as described above in the formula three to the formula six.

The image processor 110 sequentially determines whether each second detection point P22-P2n is located in the circular area (i.e., the second enlarged image S2), to record second detection points in the first enlarged image S1 are located in the second enlarged image S2. If the value of the determined value $d_{new}$ is equal to or less than zero, it means that the detection point is still located within the circular area of the second enlarged image S2.

Accordingly, as long as the determined value $d_{new}$ is equal to or less than zero, it means that the detection point is located within the circular area of the second enlarged image S2. Therefore, the image processor 110 can find and record multiple second detection points in the first enlarged image S1 that are located in the same horizontal row as the second starting point P21 and located in the circular area.

In step S407, the image processor 110 maps the recorded second detection points with the vertical line L2 as the center to obtain the corresponding coordinates corresponding to the sector area. The image processor 110 obtains the pixels (the first detection point, the second detection point . . . ) in the first enlarged image S1, which are located in the sector area 310, through the above steps S404-S407, and obtains the corresponding coordinates in the sector area 320 through mapping.

In step S408, after obtaining and recording the corresponding coordinates corresponding to the sector areas 310 and 320, the image processor 110 further maps the recorded detection points with the horizontal line L1 as the center, so as to obtain the corresponding coordinates corresponding to the sector areas 330, 340, and to obtain pixel coordinates of the entire circular area to form the second enlarged image S2.

In step S409, after confirming the second enlarged image S2, the image processor 110 generates updated driving signals according to the main image S0 and the second enlarged image S2 to drive the display panel 120, so that the display panel 120 simultaneously displays the main image S0 and the second enlarged image S2.

as shown in FIG. 3, in one embodiment, the image processor 110 set a center point of the first enlarged image S1 as the circle center P0 of the second enlarged image, and sets a "shortest linear distance" from the center point of the first enlarged image S1 to an outline edge of the first enlarged image S1 as the radius r of the second enlarged image S2, but the present disclosure is not limited to this. The image processor 110 can determine the radius r according to the enlargement command.

As described in the foregoing embodiments, in other embodiments, the outline of the second enlarged image S2 can be non-rectangular and not limited to a perfect circle. For example, the image processor 110 can also modify the first enlarged image S1 into an ellipse to form the second enlarged image S2. The process and principle of the image processor 110 modifying the first enlarged image S1 into the non-rectangular image are similar to the above steps S401-S409, "the circle center" in the above steps S401-S409 can be changed to "the center point of the non-rectangular image", and "the radius" can be changed to "the shortest linear distance from the center point to the outline edge of the non-rectangular image". Accordingly, the pixels in the first enlarged image S1 located in the second enlarged image S2 can be quickly determined.

Since the present disclosure enlarges the image and modifies the image by the image processor 110 in the display device DP, the computation of the graphics processor in the host device HD can be reduced. In addition, even if the application program 220 in the host device HD does not have the function of "enlargement image", the host device HD can still transmit the enlargement command to the display device DP, so as to program the enlargement process by the image processor 110 in the display device DP. Accordingly, the function of the display device DP is more comprehensive, or realizes display performance that the application program 220 does not have or is difficult to implement.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image display method, comprising:
   receiving, by an image processor, an image signal from a graphics processor, wherein the image signal is configured to control the image processor to drive a display panel to display a main image;
   receiving, by the image processor, an enlargement command from the graphics processor, and identifying a target area in the main image according to the enlargement command;
   enlarging, by the image processor, the target area in the main image to form a first enlarged image;
   setting a circle center and a radius in the first enlarged image to determine a plurality of sector areas, wherein each of the plurality of sector areas is symmetric with the circle center as a symmetry point;
   obtaining a plurality of first pixels in one of the plurality of sector areas in the first enlarged image;
   taking the circle center as the symmetry point, and obtaining a plurality of second pixels symmetric with the plurality of first pixels in order to modify the first enlarged image into a non-rectangular image to use the non-rectangular image as a second enlarged image; and
   driving, by the image processor, the display panel to display the main image and the second enlarged image simultaneously, wherein the second enlarged image is overlapped on the main image.

2. The image display method of claim 1, wherein obtaining the plurality of first pixels in the one of the plurality of sector areas in the first enlarged image further comprises:
   setting a first starting point in the first enlarged image, wherein a distance between the first starting point and the circle center is equal to the radius;
   setting a first detection point at every first interval along a first direction; and
   sequentially determining whether a distance between the first detection point and the circle center is equal to or less than the radius.

3. The image display method of claim 2, wherein obtaining the plurality of first pixels in the one of the plurality of sector areas in the first enlarged image further comprises:
   setting a second starting point in the first enlarged image, wherein a distance between the second starting point and the circle center is less than the radius;
   setting a second detection point at every second interval along a first direction; and
   sequentially determining whether a distance between the second detection point and the circle center is equal to or less than the radius.

4. An image display device, comprising:
   a display panel; and
   an image processor coupled to the display panel, and configured to receive an image signal from a graphics processor to drive the display panel to display a main image;
   wherein the image processor is configured to receive an enlargement command from the graphics processor and identify a target area in the main image according to the enlargement command;
   wherein the image processor is configured to enlarge the target area in the main image to form a first enlarged image;
   the image processor is further configured to:
   set a circle center and a radius in the first enlarged image to determine a circular area;
   set a first starting point in the first enlarged image, wherein a distance between the first starting point and the circle center is equal to the radius;
   determine whether a plurality of first detection points in the first enlarged image that are in a same row with the first starting point are in the circular area to modify the first enlarged image into a non-rectangular image to use the non-rectangular image as a second enlarged image, wherein the display panel is configured to display the main image and the second enlarged image simultaneously, and the second enlarged image is overlapped on the main image.

5. The image display device of claim 4, wherein the first starting point and the plurality of first detection points have a same Y-axis coordinate.

6. The image display device of claim 4, wherein the image processor is configured to set a second starting point in the first enlarged image, a distance between the second starting point and the circle center is less than the radius; and the image processor is further configured to determine whether a plurality of second detection points in the first enlarged image that are in a same row with the second starting point are in the circular area.

7. The image display device of claim 6, wherein the first starting point and the second starting point have a same X-axis coordinate.

8. The image display device of claim 4, wherein the image processor is configured to set a center point of the first enlarged image as the circle center of the second enlarged image.

9. The image display device of claim 4, wherein the image processor is configured to set a shortest linear distance from a center point of the first enlarged image to an outline edge of the first enlarged image as the radius of the second enlarged image.

* * * * *